Aug. 22, 1944.  P. W. THORNHILL  2,356,481

SHOCK ABSORBING SUSPENSION DEVICE FOR VEHICLES

Filed June 26, 1942

Inventor
Peter Warbows Thornhill
by Stevens and Davis
his attorneys

Patented Aug. 22, 1944

2,356,481

UNITED STATES PATENT OFFICE 2,356,481

SHOCK ABSORBING SUSPENSION DEVICE FOR VEHICLES

Peter Warborn Thornhill, Leamington Spa, England, assignor to John Henry Onions, Coventry, England Application June 26, 1942, Serial No. 448,707
In Great Britain July 14, 1941

12 Claims. (Cl. 267—64)

This invention relates to shock absorbing suspension devices for vehicles, and it has for its primary object to provide improvements or modifications in the form of device described in my co-pending applications Serial No. 372,417 dated December 30, 1940, (now Patent No. 2,308,404, issued January 12, 1943) and No. 423,380 dated November 17, 1941, the specifications of which describe a shock absorber having a variable volume working space which is filled with liquid and which communicates by way of a damping valve device with a chamber arranged so that liquid entering it causes energy to be stored in resilient means, thereby placing the liquid under sufficient pressure to support the normal static load on the shock absorber, characterised by the fact that a container for pressure fluid communicates with pressure fluid in the shock absorber by way of a very constricted passage or passages, whereby the container becomes charged with pressure fluid which, during the operation of the shock absorber, has a substantially steady pressure corresponding to the static load carried at the time, the said pressure being caused to act upon the damping valve device and control the action of the latter.

It is an object of the invention to provide a form of shock absorbing suspension device which is relatively simple in construction and which is arranged to take account of the momentum which is unavoidably imparted to the vehicle body or equivalent when traversing bumps or depressions. As in the devices described in the above-mentioned specifications, provision is made whereby a damping valve adapted to control the movements of the device is regulated automatically to suit the static load which is being supported by the shock absorber.

In a telescopic liquid damped shock absorbing device utilising compressed gas as a resilient medium for supporting the normal load, and having a damping valve controlled by a control piston, which later is subject to the fluctuating fluid pressure within the shock absorber and is at the same time acted upon in the opposite sense by a force corresponding to the static load on the shock absorber, according to the present invention that area of said control piston which is subject to the fluctuating fluid pressure is greater than the area of that surface of the damping valve member which is acted upon by the same fluid pressure (but in the opposite direction) to open the valve, whereby the opening movement of the damping valve is retarded during the recoil stroke of the shock absorber. As a result a pressure differential is built up across said valve before the latter opens, the valve of said differential being dependent upon the fluid pressure which is present in the chamber.

There is further provided according to the invention a shock absorbing device utilising compressed gas as a resilient medium for supporting the normal load, and having a damping valve controlled by a control piston, which latter is subject to the fluctuating fluid pressure within the shock absorber, and is at the same time acted upon in the opposite sense by a force corresponding to the static load on the shock absorber, wherein the damping valve comprises a disc member the periphery of which co-operates with a surrounding annular member to form a substantial closure, both of said members being slidable within a plunger tube, one being moved by fluid in one direction to open the damping valve, and the other being moved by fluid acting in the other direction, this also opening the damping valve.

Preferably the area of the damping valve upon which fluid pressure acts to open said valve is substantially one-half the area of the control piston, for this is found to modify the action of the shock absorber in such a manner that the momentum in a vertical sense acquired by the vehicle body on encountering a bump or depression is efficiently destroyed, so that the vehicle body is rapidly restored to a condition of equilibrium (in a vertical sense). Thus, where the damping valve comprises an annular member and a disc member, as above mentioned, the cross-sectional areas of these members may be made substantially equal; further, the outside diameter of the annular member may be substantially equal to the diameter of the control piston.

As a further feature of the invention there is provided a shock absorbing device wherein means which control the action of the damping valve device act, during the recoil following a compression stroke, to maintain the damping valve closed until the liquid pressure in the variable volume working space falls to a pressure, which latter is below the normal static value by an amount substantially equal to the amount by which the pressure within the chamber exceeds the said static value, whereupon the damping valve opens to permit transference of liquid from the variable volume working space to the said chamber.

If desired a longitudinal rod operatively connecting the damping valve with the control piston may be slidably mounted with respect to said piston, the latter conveniently being disposed between, and being normally centralised by, a pair of coiled compression springs. Thus the control piston may be slidably mounted between a pair of members connected respectively with the disc member and the annular member of the damping valve device.

The invention is illustrated by way of example in the accompanying diagrammatic drawing, in which.

Figure 1:
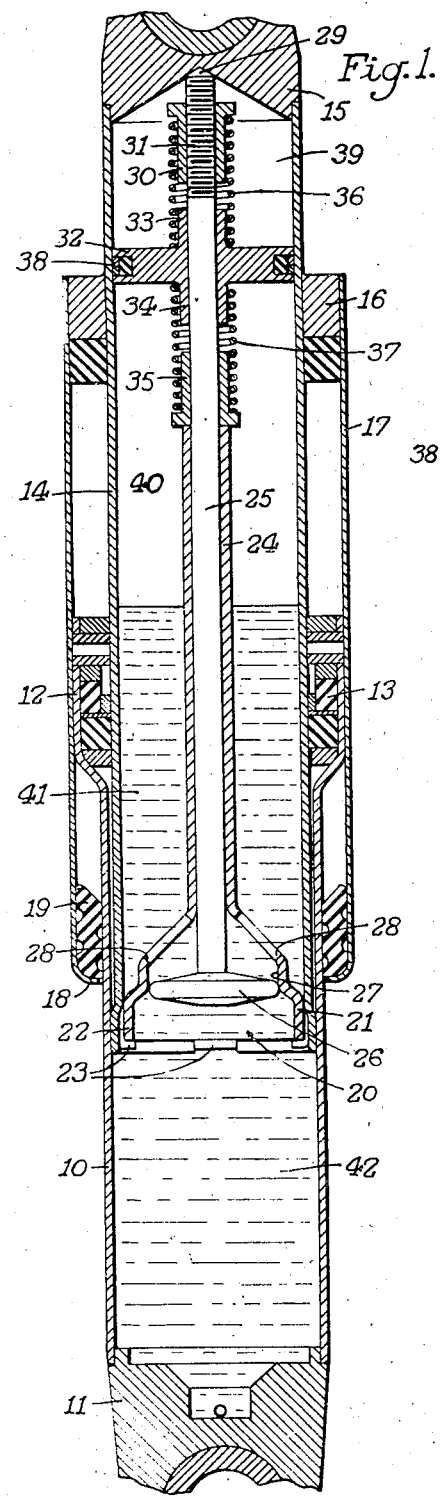
Figure 1 is a sectional elevation of a complete shock absorbing suspension device in its normally loaded and static condition.

A tubular cylinder 10 closed at its lower end by a plug 11, which latter serves as one attachment for the shock absorber in the usual manner, is enlarged in diameter at its upper end, as indicated at 12, and accommodates a packing assembly 13. This co-operates slidably and in a liquid-tight manner with the external surface of a plunger tube 14, which latter is closed at its upper end by a plug 15 forming the second attachment lug or equivalent of the shock absorber. The plunger tube 14 is fitted with an external collar 16 carrying a shroud tube 17, this being turned inwards at its lower end, as indicated at 18, so as to support a cushion member 19 which serves to limit the extension of the shock absorber by engagement with the enlarged portion 12 of the cylinder tube 10. The shroud tube 17 also protects the external sliding surface of the plunger tube 14 from dirt, moisture and other foreign matter.

A damping valve device, which is indicated generally at 20, occupies the lower or inner end of the plunger tube 14 and comprises an annular member 21, which, in the construction shown, is substantially funnel-shaped, with its rim portion 22 fitting slidably in a fairly liquid-tight manner within the lower end of the plunger tube 14, which latter has turned-in lugs 23 arranged to act as a stop for limiting the downward movement of the annular member 21. This member also has a tubular stem 24, which extends coaxially of the plunger tube 14 and contains an axial rod, tube or equivalent 25, to the lower end of which is fastened a disc member 26. The periphery of the disc member 26 is slidable along a cylindrical surface 27 formed within the annular member 21, and just to the rear of this surface said annular member 21 has openings 28. It will thus be seen that when the parts are in the positions shown in Figure 1 the lower end of the plunger tube 14 is completely closed by the damping valve device 20, but that the latter can be opened either by lowering the disc member 26 out of engagement with the cylindrical surface 27, or by raising the annular member 21, again so that the cylindrical surface 27 leaves the periphery of the disc member 26.

The cross-sectional area of the disc member 26 (i. e. its area as seen from a position in line with the axis of the shock absorber) is arranged to be approximately one-half of the corresponding cross-sectional area of the interior of the plunger tube 14. It therefore follows that the effective cross-sectional area of the annular member 21 is approximately equal to that of the disc member 26.

The upper end of the axial rod 25 normally engages the plug 15 at 29 and carries a fixedly mounted collar 30, which is conveniently adjustable by means of a screw thread 31. Below the collar 30 a control piston 32, formed with a pair of integral bosses 33 and 34, is slidable upon the axial rod 25 freely but in a substantially fluid-tight manner. A lower collar 35, also freely slidable upon the rod 25, engages with the upper end of the tubular stem 24. A coiled compression spring 36 is fitted between a flange on the collar 30 and the control piston 32, while a similar spring 37 is interposed between a flange on the collar 35 and the under side of the control piston 32; the springs 36 and 37 therefore tend to centralize the control piston 32 with respect to the collars 30 and 35. The outer edge of the control piston 32 is grooved for the accommodation of a packing assembly, indicated at 38, this being so constructed that it leaks slightly and provides a relatively small communicating passage between compressed air disposed in the working space 39 above the control piston 32 and another body of compressed air in the working space 40 below said control piston. The working space 40 also contains a quantity of damping liquid indicated at 41, which liquid extends through the damping valve 20 and completely fills the main cylinder working space 42.

When the device is installed on a vehicle it operates as follows. The plunger tube 14 is secured to the vehicle body by means of the plug 15, while in a similar manner the plug 11 at the bottom of the cylinder tube 10 is attached to the wheel, axle or equivalent of the vehicle. Thus when the vehicle is stationary, or is running along a smooth surface, the gravitational load on the shock absorber acting to shorten it in an axial direction creates pressure in the liquid 42 within the cylinder 10, thus correspondingly compressing the air within the space 40 of the plunger tube 14 until the pressure of said air is able to support the axial load. After a time the air pressure within the space 39 above the control piston 32 will also be at the same pressure due to the slow leakage which is permitted by said control piston. With the control piston 32 thus in its normal position the disc member 26 of the damping valve device 20 is disposed just within the cylindrical housing 27 of the annular member 21; so that the lower end of the plunger tube is closed in a substantially fluid-tight manner.

Figure 2:
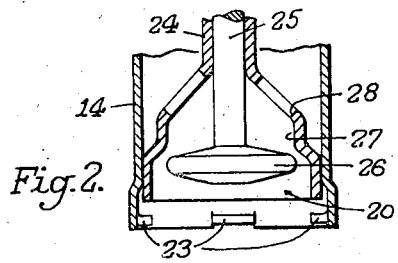
Figure 2 is a fragmentary sectional view of the damping valve device, showing the action of the parts when the shock absorber is being shortened from its static condition.
Figure 3:
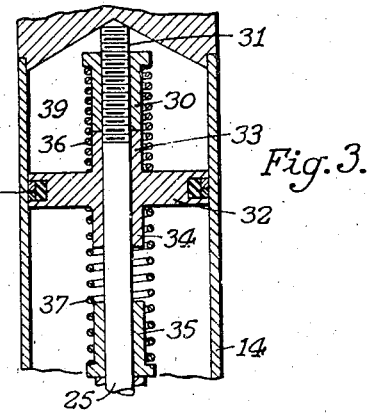
Figure 3 is a fragmentary sectional view, showing the control piston in the position it occupies at the end of a compression stroke.

When the vehicle wheel or equivalent encounters a bump in the road surface it rises rapidly, thus shortening the shock absorber, the consequent reduction in the volume of the cylinder space 42 causing the liquid to force upwardly the annular member 21 so that the cylindrical portion 27 thereof is lifted clear of the disc member 26, as shown in Figure 2, thus enabling the liquid from the cylinder space 42 to flow freely past the edge of the disc member 26 and through the holes 28 into the space 41 of the plunger tube. The air pressure in the space 40 of the plunger tube is consequently raised, and as the action is extremely rapid, the air pressure within the space 39 remains substantially at its original value, corresponding to the static load on the shock absorber. Owing to the increase in pressure in the space 40, therefore, the control piston 32 is forced upwards until its boss 33 engages with the under surface of the collar 30, as shown in Figure 3, said control piston thus holding the axial rod 25 in firm contact with the plug 15, and so retaining the disc member 26 fully raised. As the upward movement of the cylinder 10 ceases, the spring 37 returns the annular member 21 into engagement with the stops 23. It will be appreciated that during the shortening of the shock absorber a slight upward momentum is imparted to the vehicle body, although, of course, this movement is relatively slow on account of the relatively heavy weight of said body.

Figure 4:
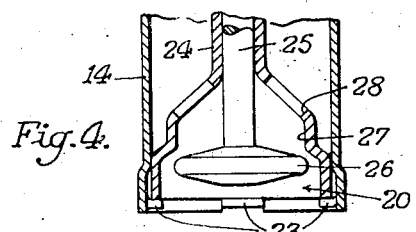
Figure 4 is a view, similar to Figure 2, showing the action of the damping valve during lengthening of the shock absorber.

As recoil takes place the shock absorber lengthens and the liquid pressure in the cylinder space 42 rapidly falls until such time as the control piston 32 permits the disc member 26 to move downwards. Owing to the difference in the areas of the control piston 32 and the disc member 26, the augmented fluid pressure within the space 40, 41 exerts an upward force on said control piston. This is, of course, counteracted by the approximately static pressure of air in the space 39, and is assisted by the relatively low liquid pressure in the cylinder space 42. Therefore, as the pressure in this space 42 continues to fall there comes a time when the air in the space 39 pushes down the control piston 32, and enables the pressure liquid 41 to move the disc member 26 downwards. The method in which the damping valve device opens during this stage of operation is shown in Figure 4. If the control piston 32 had the same diameter as the disc member 26, this state of affairs would be reached as soon as the pressure of the liquid in the cylinder space 42 was just that which would be necessary to support the static load on the shock absorber, but it will be seen that this would not counteract the already existing upward momentum of the vehicle body. In order to produce the desired effect the area of the disc member 26 is arranged to be less than the area of the control piston 32; preferably it is half the area, as this enables the liquid pressure in the cylinder space 42 to fall to a value, which is less than the normal by an amount substantially equal to the extent by which the air pressure in the space 40 of the plunger tube is in excess of normal. Thus, if P is the normal fluid pressure within the shock absorber when the latter is bearing its static load, and if the pressure of the air in the space 40 of the plunger tube rises to a value, say P+d, then the damping valve 20 will not open until the pressure within the cylinder space 42 falls to a value P—d during the following recoil stroke. This pressure relationship is maintained throughout the recoil stroke, for if the liquid tends to escape too rapidly through the damping valve 20, said valve automatically closes until the said relationship is restored. During recoil, therefore, the weight of the vehicle body is not fully supported by the shock absorber (which would, of course, require a liquid pressure in the cylinder space 42 equal to P), so that the vehicle's upward momentum previously referred to is rapidly destroyed. Nevertheless the transference of liquid from the space 41 to the cylinder space 42 lowers the pressure of the air in the plunger space 40, so that by the time the shock absorber has assumed its normal length the air pressure in the space 40 of the plunger tube will have become normal, and therefore the liquid in the cylinder space 42 will have a pressure P capable of fully supporting the static load.

Figure 5:
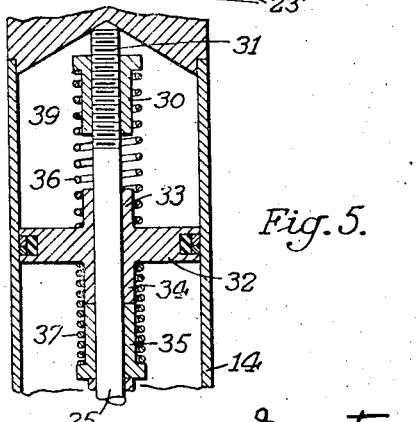
Figure 5 is a view, similar to Figure 3, showing the control piston at the end of an extension stroke.

The reverse effect takes place when the vehicle wheel crosses a pothole or like depression, and in this case, during the lengthening stroke of the shock absorber the reduction in pressure in the cylinder space 42 causes the disc member 26 to move in a downward direction as shown in Figure 4, so that its periphery leaves the cylindrical housing 27 and liquid is permitted to flow freely from the space 41 into the cylinder space 42. This, of course, lowers the air pressure in the plunger space 40, with the result that the air at normal pressure trapped within the space 39 forces the control piston 32 in a downward direction into engagement with the collar 35, as shown in Figure 5. The downward force upon the control piston 32 thus acts through the tubular stem 24 and holds the annular member 21 firmly in engagement with the stop 23, so that during the first part of the recoil stroke (which in this instance tends to shorten the shock absorber) the liquid in the cylinder space 42 cannot escape from said space 42. Its pressure increases, therefore, and when it exceeds the normal value by an amount which is substantially equal to the amount by which the fluid pressure in the plunger tube 14 is less than normal, the annular member assumes a state of equilibrium. Any further increase causes the liquid to lift the annular member 21, as shown in Figure 2, and to permit shortening of the shock absorber. Thus an increased upward force is exerted upon the vehicle body for the purpose of neutralising the downward momentum which was acquired by the vehicle body as it crossed the pothole or depression; the value of the increase in the upward force at any instant is dependent upon the amount of extension of the shock absorber, and diminishes to zero as the normal length is reached, the shock absorber then exerting just sufficient upward force to support the static load.

It will be understood that the shock absorbing suspension device which has been described is given merely by way of example, and that various modifications may be made in the form and arrangement of the parts. Moreover the ratio of the area of the control piston to the effective area of the damping valve device may be of any suitable value in order to secure the smoothest running.

What I claim is:

1. A telescopic liquid-damped shock absorber utilizing compressed gas as a resilient medium for supporting the normal load, said shock absorber including telescopically-related cylinders defining a lower liquid-charged space and an upper gas-charged space, a damping valve in the liquid receiving space, a control piston in the gas-receiving space, means connecting said control piston to said damping valve so that the former operates to control the latter, the control piston being subjected on one side to fluctuating pressure of the liquid and on the opposite side to a gas pressure corresponding to the static load on the shock absorber, the surface area of the control piston subjected to fluctuating liquid pressure being greater than the area of the damping valve oppositely acted on by the same pressure, whereby the opening movement of the damping valve is retarded during recoil stroke of the shock absorber.

2. A telescopic liquid-damped shock absorber utilizing compressed gas as a resilient medium for supporting the normal load, said shock absorber including telescopically-related cylinders defining a lower liquid-charged space and an upper gas-charged space, a damping valve in the liquid receiving space, a control piston in the gas-receiving space and operating to control the damping valve, the control piston being subjected on one side to fluctuating pressure of the liquid and on the opposite side to a gas pressure corresponding to the static load on the shock absorber, the surface area of the control piston subjected to fluctuating liquid pressure being greater than the area of the damping valve oppositely acted on by the same pressure, the damping valve including a disc member, a cooperating annular member having a fluid sealing bearing in one cylinder and forming with the disc member a substantial closure, and connections between said members and the control piston, the parts of the damping valve being relatively movable to open the valve under fluid pressure in either of two opposite directions.

3. A construction as defined in claim 1, wherein the area of the damping valve responsive to opening pressure is substantially one-half the surface area of the control piston.

4. A construction as defined in claim 2, wherein the cross-sectional area of the disc member of the damping valve is substantially equal to the corresponding area of the cooperating annular member.

5. A construction as defined in claim 2, wherein the maximum diameter of the annular member of the damping valve is substantially equal to the diameter of the surface area of the control piston.

6. A construction as defined in claim 1, wherein the control piston is slidably mounted in and of substantially the same internal diameter as one of the telescopic-related cylinders.

7. A construction as defined in claim 1, wherein the means connecting said control piston to said damping valve is a rod, said rod being slidably mounted relative to the piston.

8. A construction as defined in claim 1, wherein the means connecting the control piston to the damping valve is a rod, said rod being slidably mounted relative to the piston, and wherein a pair of coiled compression springs normally position such control piston relative to said rod.

9. A construction as defined in claim 2, wherein the connections between the control piston and the disc and annular members include a pair of elements connected respectively with the disc member and with the annular member and wherein the control piston is slidably mounted between said elements.

10. A construction as defined in claim 2, wherein the connection between the disc member of the damping valve and the control piston includes a rod carrying the disc member of the damping valve and extending axially of the shock absorber, and wherein the annular member of the damping valve is funnel-shaped and is provided with a tubular stem slidably surrounding said rod.

11. A construction as defined in claim 2, wherein the connection between the disc member of the damping valve and the control piston includes a rod carrying the disc member of the damping valve and extending axially of the shock absorber, and wherein the annular member of the damping valve is funnel-shaped and is provided with a tubular stem slidably surrounding said rod, and wherein the interior of said annular member has a substantially cylindrical surface for cooperation with the periphery of said disc member, the annular member being formed to permit liquid flow between such annular member and disc member when the latter is disposed beyond said cylindrical surface.

12. A construction as defined in claim 2, wherein a pair of elements constituting a part of the connections between the control piston and the disc and annular members are connected respectively to the disc member and annular member to provide limiting elements between which the control piston is slidably mounted, and wherein stops are provided for the annular member and disc member respectively to limit their respective movements in opposite directions of such member, the damping valve being closed when the members are in engagement with their stops or open when either member is free of its stop.

PETER WARBORN THORNHILL.

CERTIFICATE OF CORRECTION.

Patent No. 2,356,481. August 22, 1944.

PETER WARBORN THORNHILL.

It is hereby certified that error appears in the printed specification of the above numbered patent requiring correction as follows: Page 1, first column, line 43, for the word "later" read --latter--; and second column, line 2, for "valve" second occurrence, read --value--; and that the said Letters Patent should be read with this correction therein that the same may conform to the record of the case in the Patent Office.

Signed and sealed this 17th day of October, A. D. 1944.

Leslie Frazer (Seal)                      Acting Commissioner of Patents.